United States Patent [19]

Bakke

[11] Patent Number: 4,754,570

[45] Date of Patent: Jul. 5, 1988

[54] ELECTRIC BUG KILLING DEVICE

[76] Inventor: Daniel O. Bakke, Union, N. Dak. 58279

[21] Appl. No.: 792,448

[22] Filed: Oct. 29, 1985

[51] Int. Cl.$^4$ .............................................. A01M 1/22
[52] U.S. Cl. ..................................................... 43/112
[58] Field of Search .................... 43/112, 113; 362/431

[56] References Cited

U.S. PATENT DOCUMENTS

| | | | |
|---|---|---|---|
| 1,848,614 | 3/1932 | Folmer et al. | 43/112 |
| 1,962,420 | 6/1934 | Bradley | 43/112 |
| 1,982,123 | 11/1934 | Rittenhouse | 43/112 |
| 2,132,371 | 10/1938 | Kriwat et al. | 43/112 |
| 2,674,682 | 4/1954 | Hanson | 43/112 |
| 4,152,757 | 5/1979 | Bilson et al. | 362/431 |
| 4,158,268 | 6/1979 | De Yoreo | 43/112 |
| 4,433,367 | 2/1984 | Shelby et al. | 362/431 |
| 4,490,937 | 1/1985 | Yavnieli | 43/112 |
| 4,523,404 | 6/1985 | De Yoreo | 43/112 |
| 4,595,971 | 6/1986 | Dean | 362/431 |
| 4,603,505 | 8/1986 | Millard | 43/113 |

Primary Examiner—M. Jordan
Attorney, Agent, or Firm—Robert E. Kleve

[57] ABSTRACT

The invention comprises an electric bug killing apparatus for attachment to an outdoor lamp having a globe surrounding an illuminating element and having a fixture with projecting portions. The apparatus when attached to the lamp converts the lamp to an electric bug killing device, with the lamp acting to attract the bugs to the apparatus. The apparatus has an inner and outer screen spaced from one another in insulated relation. The inner screen has mounting means for mounting the screens to the exterior of the globe that surrounds the illuminating element. Clamping means are mounted to one of the screens along opposite edges. The clamps are attached to the projecting portions of the fixture when the screens are mounted to the globe for fixing the apparatus to the lamp.

2 Claims, 2 Drawing Sheets

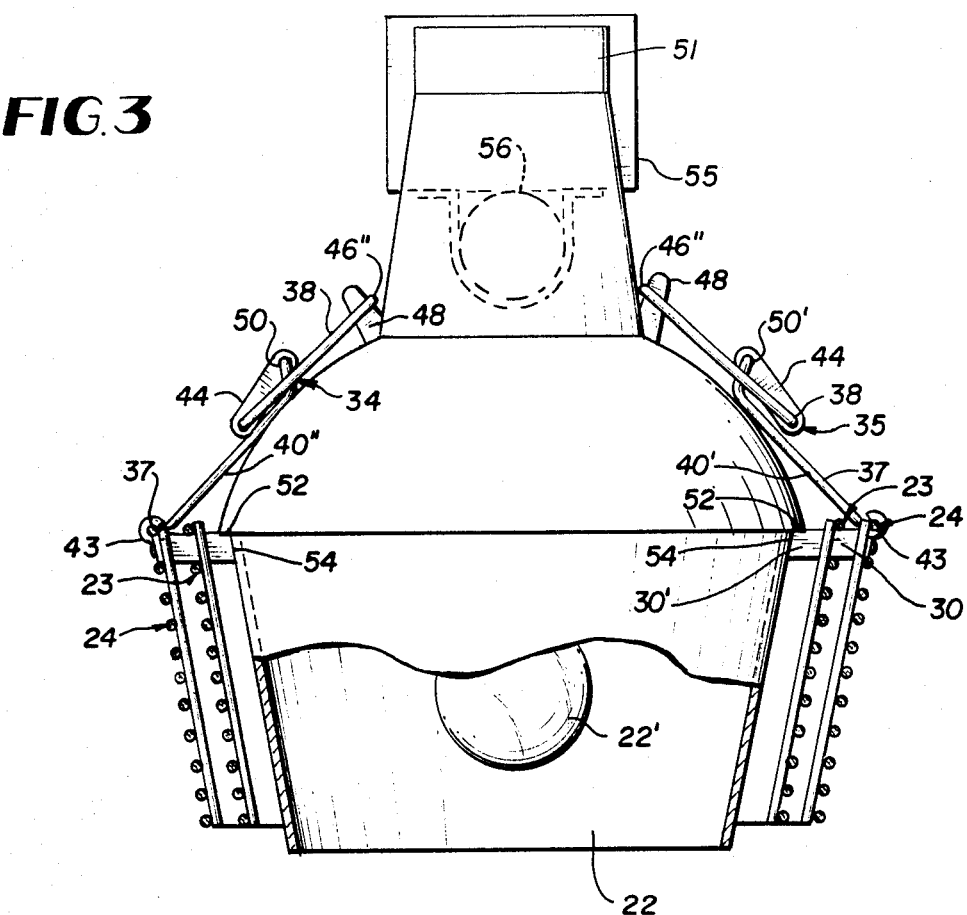
FIG. 3
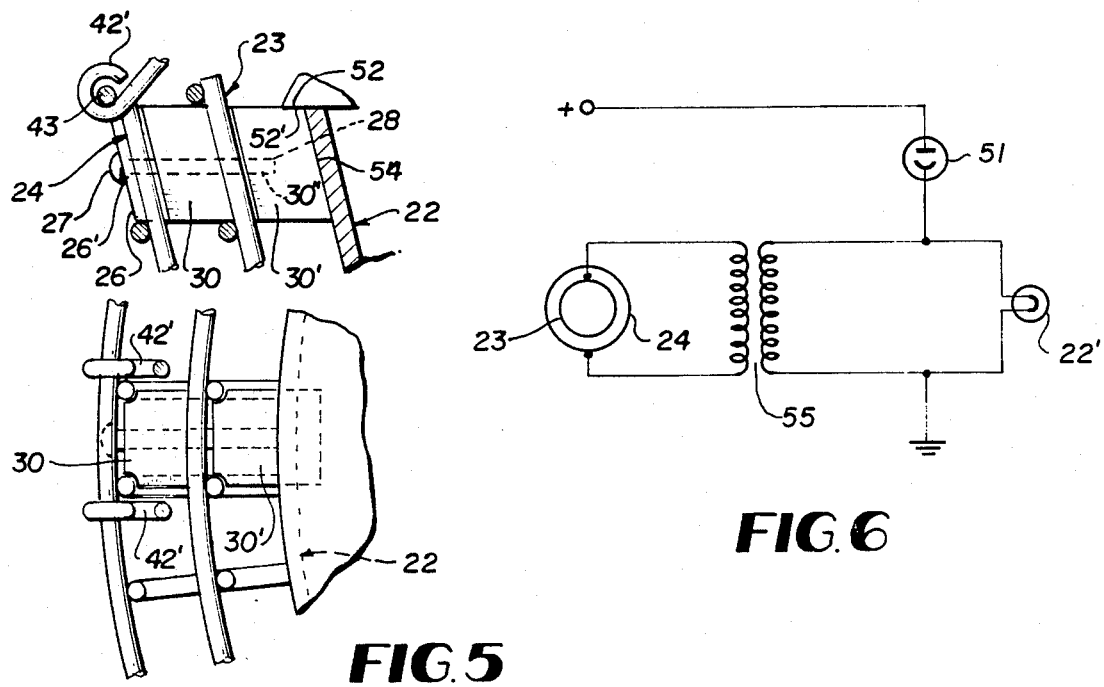
FIG. 4
FIG. 5
FIG. 6

ELECTRIC BUG KILLING DEVICE

This invention relates to electric insect killing apparatus.

It is an object of the invention to provide a novel electric insect killing device having a pair of grills that can be detachably mounted to the exterior of an outdoor light to convert it to a insect killing apparatus.

It is another object of the invention to provide a novel electric flying insect killing device that can be easily and rapidly attached to the globe of a conventional outdoor light to convert it to a insect or bug killing device, and be converted back to only an outdoor light by removing the device from the globe.

It is another object of the invention to provide a novel electric flying insect killing device that has a pair of grills that are electrically connected to a source of electric current, so that if flying insects make contact across the two grills they will be electrocuted by closing the current, and which device can be easily and readily detachably mounted to the globe of an outdoor lamp.

Further objects and advantages of the invention will become apparent as the description proceeds and when taken in conjunction with the accompanying drawings wherein:

FIG. 3 is an enlarged cross sectional view taken along line 3—3 of FIG. 2 illustrating the top spacing construction for spacing the top of the globe from the inner and outer top portions of the bug screen and for spacing the inner and outer bug screens from one another.

FIG. 4 is a cross-sectional view taken along line 4—4 of FIG. 2 illustrating the spacing construction between the inner and outer screens and the spacing and frictional engagement of the inner spacer to the upper edge of the globe and fixture of outdoor lamp.

FIG. 5 is a top view taken along along line 5—5 of FIG. 3 illustrating the top of the spacing construction between the inner and outer screens and the spacing and engagement of the inner spacer with the lamp.

FIG. 6 is a schematic diagram of the electric circuit for the bug killing screen attachment.

Briefly stated, the invention comprises an electric flying insect killing apparatus for detachably mounting to an outdoor lamp, said apparatus having a circular inner and outer metal screen mounted in insulated spaced relation to one another, and slidably mounted to the exterior of a globe of an outdoor lamp, a plurality of clamps mounted to said circular screens and adapted to detachably engage portions of the fixture of the lamp for mounting the apparatus to the lamp, once the screens have been engaged to the globe; said screens being connected in a series connection to one another and to a source of current with an open circuit between the screens, whereby if an insect makes contact across the two screens if will close or complete the circuit causing current to pass through the insect for electrocuting the insect.

Figure 1:
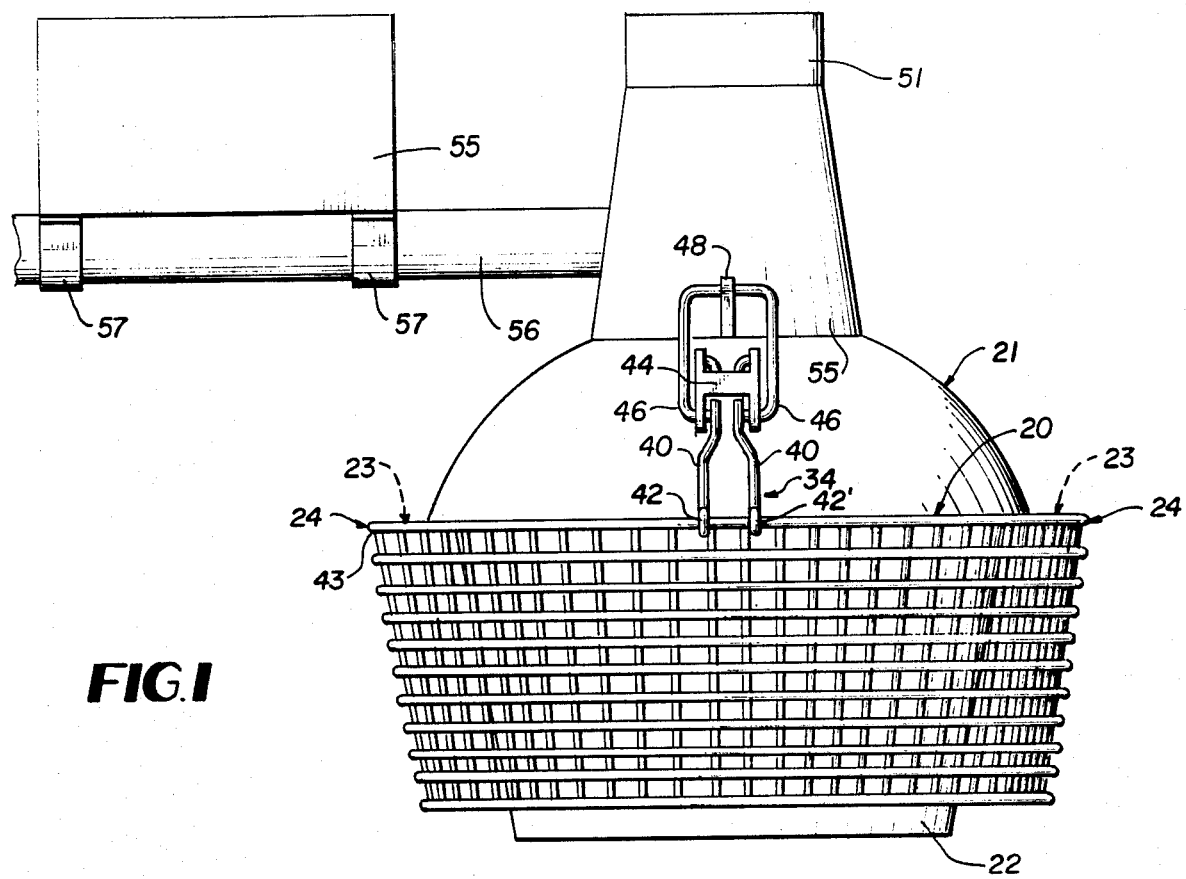
FIG. 1 is a side elevational view of the bug killing screen attachment shown attached to the globe of a conventional outdoor light or lamp.
Figure 2:
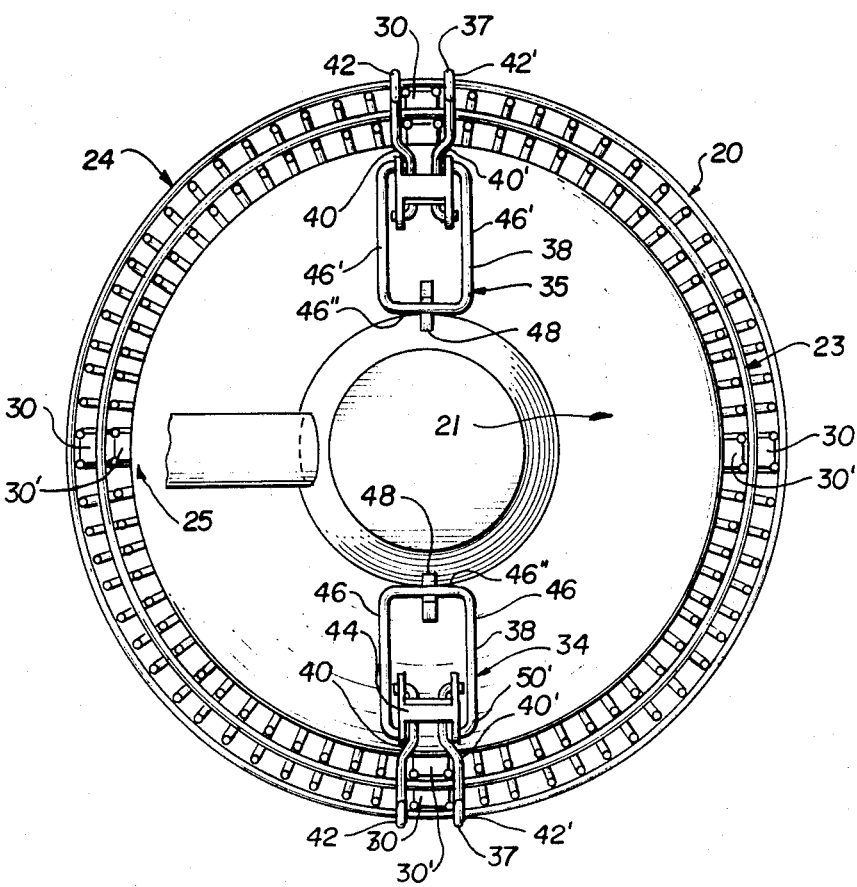
FIG. 2 is a top plan view of the bug killing screen attachment shown attached to the globe of a convenitonal outdoor light.

Referring more particularly to the drawings, in FIG. 1 the electric flying insect or bug killing device 20 is illustrated shown attached to a conventional outdoor lamp 21. The outdoor lamp has a conventional globe 22 with an illuminating element 22' therein.

A pair of cylindrical metal grills 23 and 24 are connected together in spaced relation by a plurality of glass or plastic insulation washers 25, which are fitted between the grills and between the inner grill and the globe of the lamp. The outer grill has a metal plate 26 fixed in an opening in the screen or grill 24 at four locations about the upper edge of the screen or grill and at four locations about its lower edge. The plate 26 has an opening 26' and a plastic screw 27 has a threaded bolt portion 28 passing through the opening. The screw has an enlarged head with respect to the opening abutting the plate. Each insulating washer is formed of a pair of blocks 30 and 30' located on each side of the inner screen 24. The block 30 has an opening or bore slightly oversized in relation to the bolt portion of the screw to receive it in free sliding relation, and the inner block 30' has a threaded bore 30" to threadably receive the bolt portion 28 to secure the screw threaded into the block 30'. The screws are of plastic material to electrically insulate, along with the blocks 30 and 30', the inner and outer screens or grills from one another.

A pair of clamps 34 and 35 of a conventional type are mounted on opposite edges of the outer screens. The clamps 34 and 35 are coated with plastic to electrically insulate them from the screen 24 and each clamp is formed of an upper and lower wire portion 37 and 38 respectively. The lower portion 37 of the clamp is formed of a pair of wires 40 and 40', with their lower ends forming two loops 42 and 42' about the upper horizontal rod 43 of the outer screen 24 to provide a pivotal connection between the outer screen 24 and the clamps 34 and 35. The upper ends of the wires 40 and 40' are pivotally mounted in a plate 44. The upper wire portion 38 has a wire 45 formed with its ends 46 and 46' pivotally mounted in plate 44, and with its upper intermediate portion looped about a pin 48, which pin is fixed to the frame 49 of the outdoor light or lamp 21.

When the plate 44 of the clamps are pivoted about the axis of the ends 50 and 50 ' of the wires 40 and 40', clockwise for the right clamp and counterclockwise for the left clamp when viewed from FIG. 3, it locks the clamps on the pins 48 of the lamp, thereby securing the screens 23 and 24 against the globe 22 from opposite edges, with the inner block 30' abutting the globe.

The apparatus is attached to a conventional outdoor lamp, by sliding the apparatus, including the screens 23 and 24, their clamps, and their four outer and inner blocks or spacers 30 and 30', upward about the exterior or outside of the globe until their inner edges 51 of their four inner blocks 30' abut the underside 52' at the notches 52 at the top of the globe, where the globe 22 and the fixture 53 of the lamp 21 meet. Then swinging the clamps 34 and 35 upward so that their upper intermediate portions 46" loop about the pins 48 of the lamp fixture, and then pivoting the plates 44 downward drawing the clamps 34 and 35 together in their locked position, the apparatus is attached as illustrated.

The innermost edges 54 of the inner block 30' will have a slightly larger radius with respect to the globe's outer radius, so that the screen including their blocks can be slid easily upward about the globe until their blocks reach the notched areas 54. The apparatus can be detached by the reverse process or steps.

Thus the invention provides a novel quickly detachable electric bug killing attachment for an outdoor lamp that can be quickly and easily attached to an outdoor lamp to convert it to a bug killing lamp during the summer, and the attachment can be removed quickly and easily from the lamp for the winter months so that the lamp can only serve as an outdoor lamp.

The electric circuit for the screens or grills is of a conventional type with the power for the lamp and the screens coming in on a single line to a photoelectric cell 51, and from the cell going in parallel lines with one parallel line going to the light and the other parallel line going to the inner screen 23, through a transformer 55, which transformer converts it to a higher voltage suitable for electrocuting bugs and insects. The screens 23 and 24 are in series in the line from the transformer after the voltage of the electricity has been converted to a higher voltage. The screens are in open circuit relation to one another so that when an insect such as a fly places is wings in contact between the two screens it closes the circuit between the two screens so that electricity can flow or pass through the insect and electrocute the insect.

In the electric circuit, the plus side of the circuit will connect with the inner screen 23, with the screen 24 being connected to ground. This gives some protection for the operator, since his contact with the outer screen 23 alone would not provide a complete circuit, and thus no current would flow through him under these circumstances unless he also contacts the inner screen. However, circuits of this type are common in the art.

It is intended that the invention be used in connection with yard lights that are mounted high off the ground, so as to be out of the normal reach of individuals.

The transformer 55 can be easily detached from the from the arm 56 of the outdoor lamp by removing the brackets which hold the transformer to the arm, with the photoelectric cell be disconnected from the transformer, when it is desired to remove the bug killing attachment from the outdoor lamp. A detachable connection 58 can be provided for the wire from the photoelectric cell to the transformer so that the transformer can be easily detached.

Thus it will be seen that a novel inexpensive electric bug killing apparatus has been provided for rapidly and easily converting an outdoor lamp to a bug killing apparatus, when desired.

The globe 22 and screens 23 and 24 each have a frusto conical shape with screens 23 and 24 larger than the globe 22 and screen 24 larger than screen 23 so as to fit in parallel spaced relation to one another as illustrated. Although the frusto conical shape for the screens is the preferred form of the invention, the screens 23 and 24 could be made in cylindrical shape with their upper diameters thereby spaced closer to the globe than their lower diameters.

It will be obvious than various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. An electric exterminating apparatus for attachment to an outdoor lamp having a fixture with an illuminating element depending from said fixture and a globe depending from the bottom of said fixture and surrounding said illuminating element in spaced relation, said fixture having mounting portions thereon, said exterminating apparatus having encircling inner and outer screens rigidly joined together in spaced concentric relation as a single unit, said screens and globe being at least substantially equal in height and having frusto conical portions and cooperating portions with respect to one another for at least most of their heights so that said screens may be attached to said globe by sliding said screens upward as a single unit onto said globe from beneath said globe to nest at least most of said globe in the interior of said screens with said screens in horizontal surrounding relation to said globe, clamping means at the upper edge of one of said screens at intervals about said globe and screens for detachable engagement with said mounting portions of said fixture and with said screens, with engaged, depending from said fixture as a single unit and said globe in said nested position in said screens, said clamping means being releasable from said fixture to free said screens for downward removal therefrom as a single unit.

2. An electric exterminating apparatus for attachment to an outdoor lamp having a fixture with an illuminating element and globe depending from the bottom of said fixture and surrounding said illuminating element in spaced relation, said globe having a frusto conical configuration and said fixture having mounting portions thereon, said globe having its upper end larger than its lower end, said exterminating apparatus having encircling inner and outer screens rigidly joined together in spaced concentric relation as a single unit, said screens and globe being at least substantially similar in their heights and said screens having configurations complementing said globe throughout their heights so that said encircling screens may be attached to said fixture by sliding said encircling screens upward as a single unit onto said globe from beneath said globe to nest at least most of said globe in the interior of the screens with the screens in horizontal surrounding relation to the globe, clamping means at the upper edge of one of said screens at intervals about said globe and screens for detachable engagement with the mounting portion of said fixture and with said screens, when engaged, depending from said fixture as a single unit and said globe in said nested position in said screens, said clamping means being releasable from said fixture to free said screens for downward removal therefrom as a single unit.

* * * * *